United States Patent Office 2,809,210
Patented Oct. 8, 1957

2,809,210

PROCESS FOR PREPARING BIPHENYL DERIVATIVES

Rolland W. P. Short, Wilmington, Del., and Harry Douglas Williams, Penns Grove, N. J., assignors to E. I. du Pont de Nemours and Company, Wilmington, Del., a corporation of Delaware No Drawing. Application November 29, 1955, Serial No. 549,885

3 Claims. (Cl. 260—515)

The present invention relates to an improved process for the preparation of biphenyl derivatives. More particularly the invention relates to an improvement in prior art processes for the preparation of such compounds to increase the efficiency of such prior art processes.

Biphenyl derivatives have been prepared by reacting halogenated benzene compounds with a mixture of methanol, caustic potash, and a supported palladium catalyst. For example, 4,4'-biphenyldicarboxylic acid may be prepared from p-bromobenzoic acid according to this technique. Under optimum reaction conditions, as shown in the prior art, maximum yield of the dicarboxylic acid does not exceed 35 to 55% of the theoretical. The same is true of the preparation of biphenyl from bromobenzene. See, for example, "The catalytic reduction of bromobenzene to biphenyl" by F. R. Mayo and M. D. Hurwitz, Journal of the American Chemical Society, volume 71 (1949), page 776. The principal interfering side reaction is the replacement of the ring halogen with hydrogen to form the mono-phenyl compound.

It is an object of the present invention to improve this known reaction for the preparation of biphenyl derivatives to increase its efficiency and make possible much higher yields. It is a further object of the present invention to render this prior art process commercially feasible by increasing the percentage yields of the product.

We have discovered that the yield of biphenyl derivative which may be obtained from this reaction is greatly increased if the methanol is added slowly to a mixture of the other reactants rather than being added in its entirety at the start of the reaction. A more complete understanding of the invention will be gained from a consideration of the following examples:

Example 1

A mixture of 7.84 grams of p-chlorobenzoic acid, 26.2 grams of 36% aqueous potassium hydroxide solution, 3.0 grams of 1% palladium-on-carbon, and 70 grams of water was heated to 76° C. The solution was agitated vigorously while 72 grams of absolute methanol was added dropwise over a period of two and one-half hours. Five minutes after the addition of the methanol was commenced the mixture began to reflux and continued to do so throughout the addition. When the addition of the methanol was complete, the mixture was cooled to a temperature just below the reflux temperature, and the catalyst was removed by filtration. The hot filtrate was added slowly to dilute aqueous hydrochloric acid with constant stirring. The resulting white precipitate was washed first with 100 milliliters of water and then with 100 milliliters of ethyl ether. After drying, the white solid was identified as 4,4'-biphenyldicarboxylic acid. The product weighed 4.6 grams, representing a yield of 76.0% of the theoretical, based on the p-chlorobenzoic acid.

Example 2

The procedure of Example 1 was repeated, except that refluxing was continued for an additional three and one-half hours after addition of the methanol was complete. This made a total reflux period of about six hours. The yield of 4,4'-biphenyldicarboxylic acid was 4.4 grams, representing a percentage yield of 72.7% of the theoretical, based on the p-chlorobenzoic acid.

Example 3

The procedure of Example 2 was repeated, except that the entire quantity of methanol was present in the reaction mixture at the start of the 6-hour heating period rather than being added dropwise. All other conditions were the same. 2.6 grams of 4,4'-biphenyldicarboxylic acid were obtained, representing a percentage yield of 43.0% of the theoretical, based on the p-chlorobenzoic acid.

Example 4

The procedure of Example 2 was repeated using 10 grams of p-bromobenzoic acid, 26.2 grams of 36% aqueous potassium hydroxide, 3 grams of a 1% palladium-on-carbon catalyst and 70 grams of water. The 72 grams of absolute methanol were added dropwise over a period of two and one-half hours, and refluxing was permitted to continue for an additional three and one-half hours after additional of the methanol was complete. 4,4'-biphenyldicarboxylic acid was obtained in a yield of 91.3% of the theoretical, based on the p-bromobenzoic acid.

Example 5

The procedure of Example 4 was repeated, except that all the methanol was added to the reaction mixture prior to the commencement of the 6-hour heating period. 4,4'-biphenyldicarboxylic acid was obtained in a yield of 76.3% of the theoretical, based on the p-bromobenzoic acid.

Example 6

The procedure of Example 2 was repeated using 7.84 g. of m-chlorobenzoic acid, in place of the p-chlorobenzoic acid. 3,3'-biphenyldicarboxylic acid was obtained in a yield of 86% of the theoretical, based on the m-chlorobenzoic acid.

Example 7

The procedure of Example 2 was repeated using 10.05 g. of m-bromobenzoic acid, in place of the p-chlorobenzoic acid. 3,3'-biphenyldicarboxylic acid was obtained in a yield of 97% of the theoretical, based on the m-bromobenzoic acid.

Example 8

The procedure of Example 2 was repeated using 15.6 g. of N-(p-bromophenyl) benzenesulfonamide, in place of the p-chlorobenzoic acid. N,N'-dibenzenesulfonylbenzidine was obtained in a yield of 83.4% of the theoretical, based on the N-(p-bromophenyl) benzenesulfonamide.

Example 9

A mixture of 23.5 g. of p-chlorobenzoic acid, 78.6 g. of 36% aqueous potassium hydroxide solution, 9.0 g. of 1% palladium-on-carbon and 70 g. of water was heated to 76° C. Under vigorous agitation, 2.16 g. of absolute methanol was added dropwise over a period of seven and one-half hours maintaining the temperature at 74–76° C. Following the addition the mixture was refluxed for one hour. After cooling the catalyst was removed by filtration. The filtrate was added slowly to dilute aqueous hydrochloric acid with stirring. The resulting white solid was washed with 300 ml. of water in small portions and then with 300 ml. of ethyl ether. After drying, the 4,4'- biphenyldicarboxylic acid weighed 11.1 g., representing a yield of 61% of theory based on p-chlorobenzoic acid.

It is apparent from the foregoing examples that addition of the methanol to the reaction mixture dropwise over a period of time, rather than in bulk at the start of the reaction, results in significantly higher yields. This is evidenced particularly, for example, by comparison of the percentage yields in Examples 1 and 2 with the yield in Example 3 and by comparison of the percentage yield in Example 4 with the yield obtained in Example 5.

The invention is believed to be applicable to the coupling of a wide variety of benzene derivatives, such as benzenes, toluenes, aryl sulfonamides and the like. In each case the starting composition will first be halogenated. For compounds having a functional group already present on the benzene ring, the halogen may appear in either the para or meta position.

Sodium hydroxide and potassium hydroxide are equally effective in the present invention.

We have found that the achievement of consistently high yields requires a methanol addition period of at least about an hour. Lower periods give yields which are not much higher than those already obtainable with prior art techniques. For best results, the addition period may run as high as 20 to 30 hours, depending upon the size of the charge. Generally, the greater the amount of starting materials, the longer the methanol addition period will have to be to accomplish high yields of the product. In full-scale industrial operations, the addition period will often desirably be 4 to 5 hours, or more. The total reaction time at elevated temperatures is preferably coincident with the period of time of methanol addition. The reaction period may be extended, but will gain little or no advantage in the form of a higher yield, as evidenced by comparison of the yields in Examples 1 and 2, respectively. Palladium-on-carbon has been found to be the most effective catalyst. Palladium oxide on calcium carbonate is also operable, but is somewhat less effective.

The invention appears to be limited in scope to the use of methanol as the reducing agent. No advantage is apparently obtained when the present invention is employed in connection with other reducing agents.

The present invention results in significantly higher yields of biphenyl derivatives than is obtainable by the known prior art methods. It is not unusual for the present invention to accomplish a virtual doubling of the reaction efficiency. This, of course, represents a very significant advance in the art inasmuch as it results in great reductions in the cost of the end product.

Having thus described our invention we intend to be limited only by the following claims.

We claim:

1. In a process for the coupling of benzene derivatives to form biphenyl compositions wherein a compound selected from the class consisting of the chlorides and bromides of mononuclear carbocyclic aromatic compounds is reacted with methanol in the presence of an alkali metal hydroxide and a metal catalyst, the improvement which comprises adding the methanol gradually to a mixture of the other reactants over a period of at least about one hour.

2. A process as in claim 1, wherein the metal catalyst is palladium-on-carbon.

3. In the process of preparing 4,4'-biphenyldicarboxylic acid in which a p-halogenobenzoic acid is reacted with methanol in the presence of an alkali metal hydroxide and a palladium-on-carbon catalyst, the improvement which comprises adding the methanol gradually to a mixture of the other reactants over a period of at least about one hour.

References Cited in the file of this patent

Mayo et al.: Journal American Chem. Soc., vol. 71, 1949, pp. 776–777.

Groggins: Unit Processes in Organic Synthesis, 4th edition, 1952.